Aug. 11, 1953 W. J. KEUPER 2,648,279
TYPE WHEEL INDEXING LAUNDRY LISTING MACHINE
Original Filed June 17, 1946 6 Sheets-Sheet 3
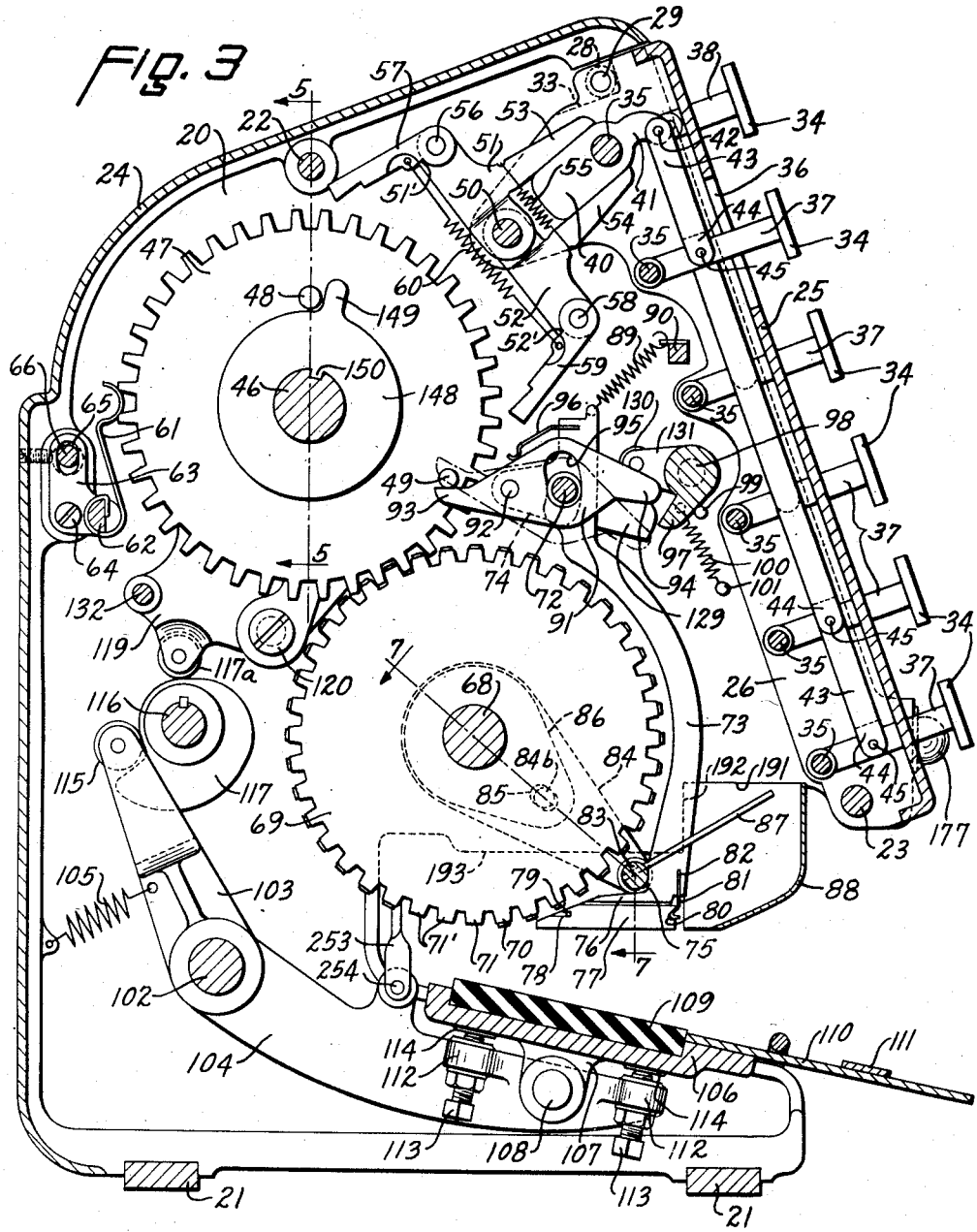
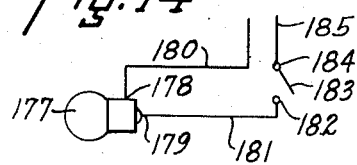
INVENTOR.
WILLIAM J. KEUPER
BY
Clarence B. des Jardins
HIS ATTORNEY

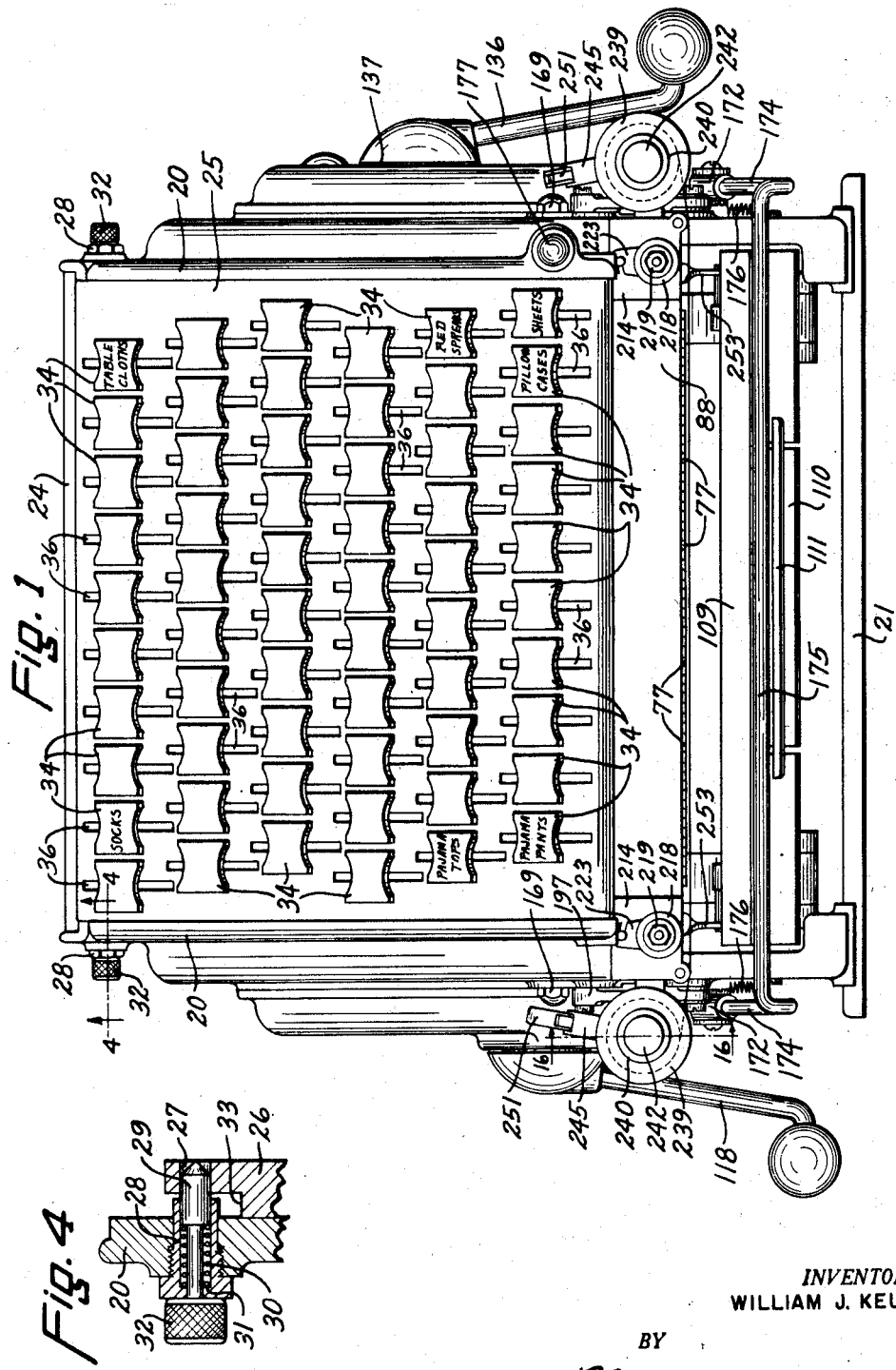

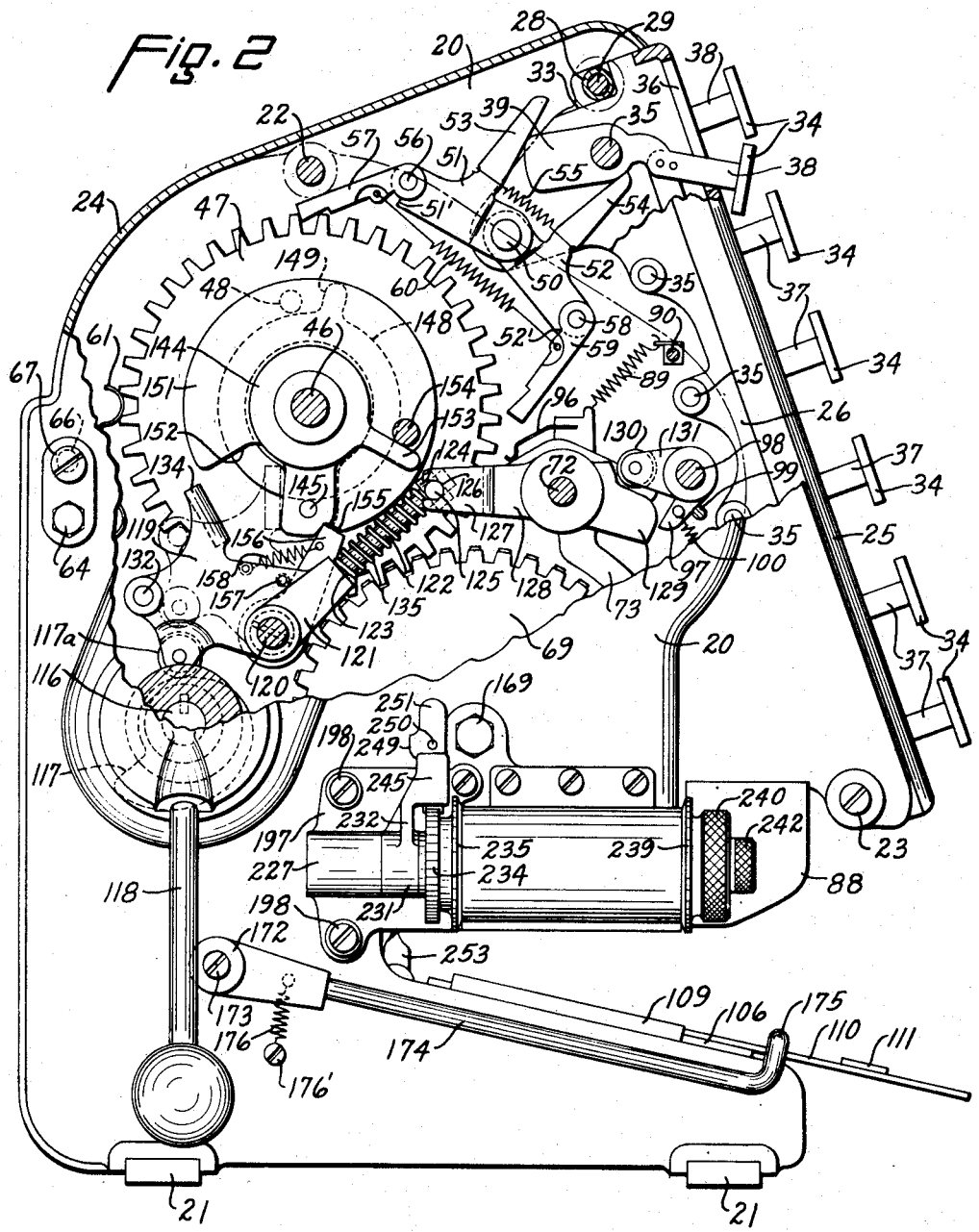

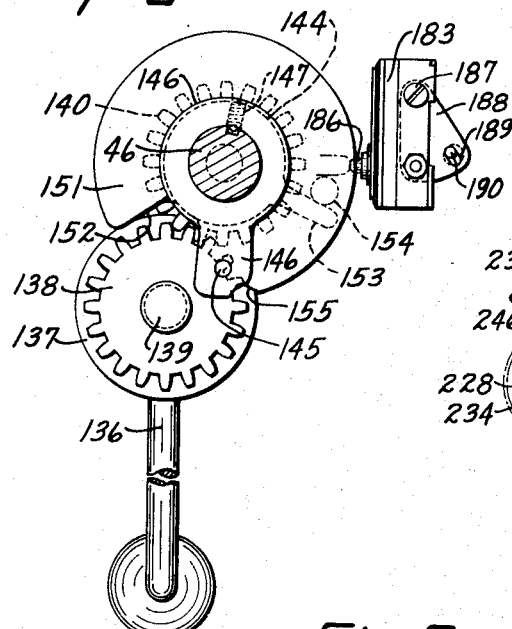
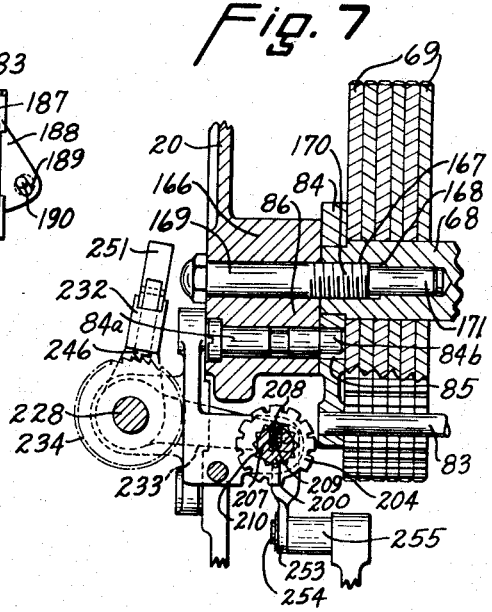
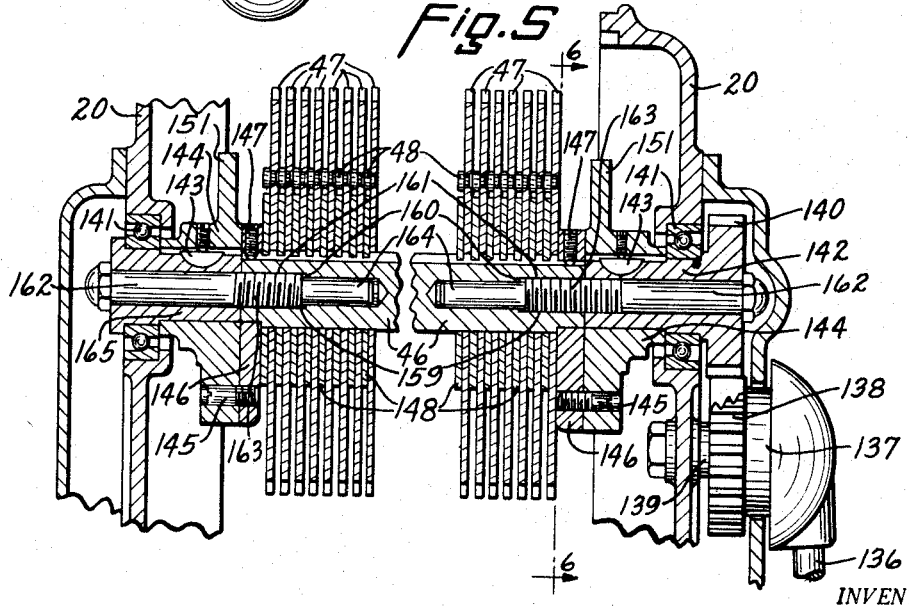

Aug. 11, 1953     W. J. KEUPER     2,648,279
TYPE WHEEL INDEXING LAUNDRY LISTING MACHINE
Original Filed June 17, 1946     6 Sheets-Sheet 5
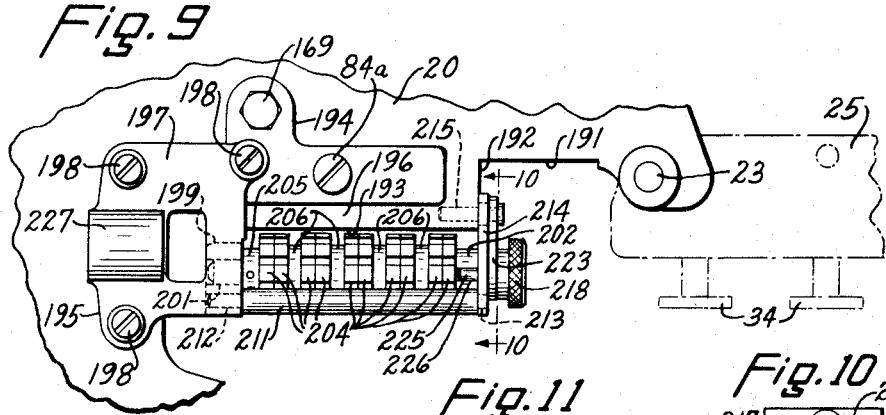
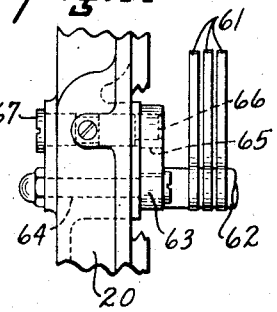
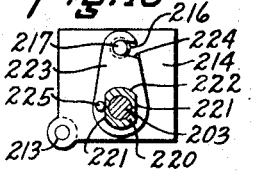
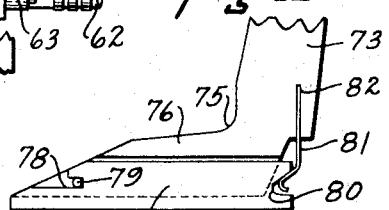
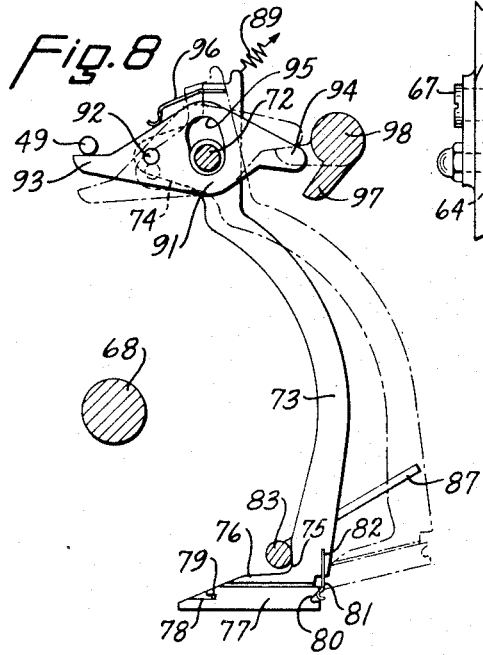
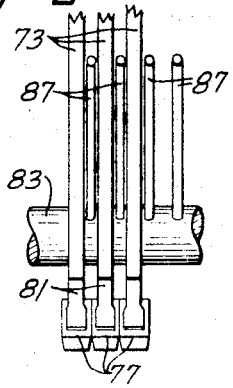
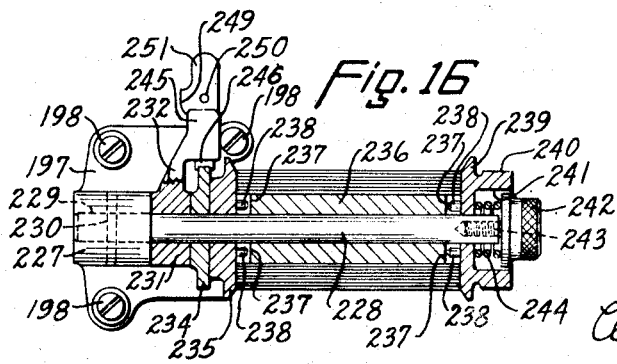
INVENTOR.
WILLIAM J. KEUPER
BY
Clarence B. DesJardins
HIS ATTORNEY Aug. 11, 1953 W. J. KEUPER 2,648,279
TYPE WHEEL INDEXING LAUNDRY LISTING MACHINE
Original Filed June 17, 1946 6 Sheets—Sheet 6

Fig.15

NATIONAL LAUNDRY COMPANY
ANYWHERE, OHIO   PHONE AB-0000
NAME JOHN DOE
ADDRESS 0000 MAIN ST.   D-135

A — 15  11  20  45  9.9
     LOT   DATE      OPER.
     NO.          NO.        ROUTE NO. 1
B —       C    D       E

| | |
|---|---|
| 4 | SHEETS |
| 2 | BED SPREADS |
| 3 | TABLE CLOTHS |
| 5 | PILLOW CASES |
| 1 | MATTRESS COVERS — F |
| 4 | LUNCH CLOTHS |
| 6 | DOILIES |
| 12 | NAPKINS |
| 10 | TOWELS BATH |
| 8 | TOWELS DISH |
| 21 | HANDKERCHIEFS — F |
| 1 | BLANKETS |

G — (at MATTRESS COVERS and HANDKERCHIEFS)

- - - - - - - - - - - - - - - - - - -

| | |
|---|---|
| 1 | OVERALLS |
| 8 | APRONS |
| 2 | NECK TIES |
| 7 | UNDERDRAWERS |
| 14 | SOCKS |
| 2 | PAJAMA PANTS |
| 2 | PAJAMA TOPS |
| 7 | UNDERSHIRTS |
| 7 | COLLARS |
| 6 | SHIRTS |

LOT   DATE C D OPER.   E
NO.                NO.
A — 15  11  20  45  99   ROUTE NO. 1

NAME JOHN DOE
B —                                D-135
ADDRESS 0000 MAIN ST.

NATIONAL LAUNDRY COMPANY
ANYWHERE, OHIO   PHONE AB-0000

INVENTOR.
WILLIAM J. KEUPER
BY
Clarence B. DesJardins
HIS ATTORNEY

Patented Aug. 11, 1953

2,648,279

UNITED STATES PATENT OFFICE 2,648,279

TYPE WHEEL INDEXING LAUNDRY LISTING MACHINE

William J. Keuper, Cincinnati, Ohio, assignor to The National Marking Machine Company, Cincinnati, Ohio, a corporation of Ohio Original application June 17, 1946, Serial No. 677,189. Divided and this application June 9, 1950, Serial No. 167,112

9 Claims. (Cl. 101—96)

My invention relates to improvements in laundry listing machines and has to do, more particularly, with an improved machine for printing a laundry list bearing the designations of the various classes of articles contained in a laundry bundle, and the number of articles in each class.

In modern laundry practice, it is desirable to provide a machine having a set of operating keys, one for each class of article likely to be found in a bundle of laundry, so that, as an operator goes through the bundle, she may operate the appropriate keys, once for each article of the class that she finds in the group of articles to be laundered. Having completed the setting up of the list by such operation of the required keys, and having placed a blank on the platen of the machine, the operator actuates the machine to print on the blank the name of each class of article found in the bundle and, opposite the name, the number of articles of the class.

One of the objects of my invention is to provide an improved laundry listing machine, in which the numeral type wheels are driven by feed gears and the feed gears are selectively advanced step-by-step by operation of appropriate keys, to correspondingly advance the proper numeral type wheels.

Another object of my invention is to provide a laundry listing machine having improved means for correcting for erroneous key operation, the keys being pivoted and rocked, in one direction, to advance the corresponding type wheel one step, and, in the other direction, to return it one step.

A further object of my invention is to provide a laundry listing machine of such construction that, when a key has been operated, by error, to advance the corresponding numeral type wheel from normal and prepare the selecting mechanism to leave the corresponding printing member at printing position in the printing operation, the error can be corrected easily by rocking the key in the opposite direction, which returns the type wheel to normal and returns the selecting mechanism to the condition in which the printing member will be moved out of printing position at the start of the printing operation.

Further objects, and objects relating to details of construction and economies of operation, will appear from the detailed description to follow. In one instance, I have accomplished the objects of my invention by the devices and means described in the following specification. My invention is clearly defined and pointed out in the appended claims. A machine constituting a preferred embodiment of my invention is illustrated in the accompanying drawings, forming a part of this specification, in which:

Fig. 1 is a view of my laundry listing machine, in front elevation.

Fig. 2 is a view of the machine in left side elevation, parts of the left side frame and the keyboard frame being broken away, to show certain of the operating parts.

Fig. 3 is a vertical sectional view through the central portion of the machine.

Fig. 4 is a detail sectional view, taken on the line 4—4 of Fig. 1.

Fig. 5 is a fragmentary, vertical sectional view through the resetting shaft, taken substantially on line 5—5 of Fig. 3.

Fig. 6 is a sectional view, taken on line 6—6 of Fig. 5, a part of the side frame being omitted.

Fig. 7 is a fragmentary, sectional view, taken substantially on the line 7—7 of Fig. 3.

Fig. 8 is a view in side elevation of one of the printing arms and its selector member, the selector member being shown in full lines in selecting position, and the printing arm and selector member being shown in dotted lines in the positions to which they are moved upon operation of the printer shaft.

Fig. 9 is a fragmentary view in left side elevation, corresponding to a part of Fig. 2, the ribbon spool being removed and the keyboard frame shown, in dotted lines, in the horizontal position it occupies when access to the parts of the machine is desired.

Fig. 10 is a detail, sectional view, taken on the line 10—10 of Fig. 9.

Fig. 11 is a fragmentary view in front elevation, showing the means for adjusting the aligning springs for the feed gears.

Fig. 12 is a view, on an enlarged scale, of the lower portion of a printing arm showing the means for attaching a printing plate thereto.

Fig. 13 is a fragmentary view in front elevation showing the lower portions of several printing arms, the printing plates carried thereby, and the comb for holding the printing arms in spaced relation.

Fig. 14 is a wiring diagram showing the circuit for the signal light.

Fig. 15 is a view of a laundry list printed on this machine, and

Fig. 16 is a detail, sectional view, taken on the line 16—16 of Fig. 1, showing the mounting of the ribbon spool.

In the drawings, the same reference numerals refer to the same parts throughout the several views and the sectional views are taken looking in the direction of the arrows at the ends of the section lines.

This application is a division of my copending application Serial No. 677,189 filed June 17, 1946 and entitled Laundry Listing Machine, now U. S. Patent No. 2,583,486.

In general, the laundry listing machine embodying my invention comprises a plurality of type wheels, selective means for rotatably advancing said wheels step-by-step from normal non-printing position, a plurality of printing members normally in printing position, one for each of the type wheels, printing mechanism for making an imprint upon a blank from the type wheels and printing members at printing position, and automatic means for moving away from printing position the printing members corresponding to type wheels in normal non-printing position. The means for moving printing members away from printing position may be actuated by the printing mechanism. The machine may include a rotatable printer shaft, means for rotating the printer shaft, and means, actuated by rotation of the printer shaft, for moving away from printing position those printing members that correspond to type wheels in normal non-printing position. There may be a cam fixed on the printer shaft which, upon rotation of said shaft, first acts to move away from printing position the printing members that correspond to type wheels in non-printing position and, then, acts on the printing mechanism to make an imprint from the type wheels and the printing members remaining in printing position. The machine may be provided with a plurality of setting keys, one for each type wheel, so arranged that the corresponding type wheel is advanced one step each time its printing key is actuated. The setting keys may be arranged to actuate feed gears, one for each setting key, which feed gears are arranged to drive the corresponding type wheels. For instance, I may provide a plurality of rotatable toothed type wheels, certain of the teeth of which bear numeral type consecutively arranged, and a feed gear for each type wheel, which meshes therewith and is arranged to be actuated by the corresponding setting key, so as to advance the feed gear one step each time the key is actuated.

My invention comprises a machine in which the printing members are carried by pivoted printing arms, that are acted on by means tending to retain the arms in printing position, devices being provided for automatically moving away from printing position the printing arms that correspond to type wheels in non-printing position. Each printing arm may be provided with a selector member, which remains in selecting position so long as the corresponding type wheel is in normal non-printing position, but moves to non-selecting position when the corresponding type wheel is displaced from the non-printing position, and automatic means for moving away from printing position the printing arms whose selector members are in selecting position. The positions of the selector members may be controlled by the corresponding feed gears, as, for instance, by means of a stud on the feed gear engaging a finger of the selector member and holding it in selecting position, so long as the feed gear is in normal position, the movement of the feed gear from normal position permitting the stud to move away from the finger so that the selector member is allowed to move to the non-selecting position. For example, I may provide a rock shaft having a pick-up ledge thereon, so that, when the shaft is rocked the ledge will engage the selector members in selecting position and move them to rock the corresponding printing arms and carry their printing members away from printing position. This rock shaft may be rocked from one position to the other by toggle mechanism, actuated by rotation of the printer shaft, to move the rock shaft from its normal to its selecting position, in which position it is retained by the toggle mechanism until returned when the toggle mechanism is restored to its previous position, upon the first operation of the resetting shaft following such printing operation. This resetting shaft provides means whereby, upon rotation thereof, all the feed gears and type wheels will be restored to their normal positions. The machine may be provided with an interlock of such nature that two successive operations of the resetting shaft cannot be performed without an intervening printing operation. This interlock may take the form of a pawl, carried by the rocker member of the toggle mechanism and cooperating with a notch in a flange fixed to the resetting shaft. When the rocker member is in its normal non-selecting position, and the resetting shaft is in its normal position, this pawl will engage the notch to prevent rotation of the resetting shaft, but the operation of the printing mechanism will move the rocker member away from its normal position, so as to remove the pawl from engagement with said notch and permit the operation of the resetting shaft.

One novel feature of my invention consists in the setting keys that are pivoted to rock in two directions, and which are so connected to the type wheels that a rocking of a key in one direction will advance the corresponding type wheel one step, while the rocking of the key in the other direction will return the type wheel one step. This affords a convenient means for correcting for erroneous depression of the keys. Each setting key is provided with a cam member for actuating the corresponding advance and return mechanism. In the case of the keys of one bank or row, the cam members are integral with the key stems, while, in the case of the remaining banks or rows of keys, the cam members are connected by links to the pivoted key stems. All the cam members are coaxially arranged on a common shaft, which also constitutes the pivot for the upper row of keys. Each cam member may be interposed between the operating arms of a corresponding pair of bell cranks, each of which bell cranks has a pawl-carrying arm on which a pawl is pivoted, one of these pawls being engageable with the corresponding feed gear to advance it one step, when the corresponding cam member is rocked in one direction, and the other pawl being engageable with the feed gear to return it one step, when the corresponding cam member is rocked in the other direction.

The setting keys may all be mounted in a keyboard frame, which is pivotally mounted on the main frame of the machine, so that it may be swung down to a horizontal position, in which access may be had to the feed gears and type wheels for purposes of adjustment or repair. This keyboard frame may carry the shafts on which the keys are pivoted, and also the shaft on which the bell cranks actuated by these keys are located.

The machine may be provided with a signal light, which is lit by the rotation of the resetting shaft to the end of its forward stroke, so as to show the operator that the resetting operation has been correctly performed. This signal light may be connected in an electric circuit with a normally open switch, which is closed by a part carried by the resetting shaft, when that resetting shaft has been turned to the limit of movement in one direction.

Referring to the numbered parts of the drawings, I have illustrated a laundry listing machine comprising a pair of side frames 20 connected together, at the bottom, by the transverse bars 21 and, near the top center, by the transverse shaft 22, and near the front lower portion of the keyboard, by the transverse shaft 23. A casing 24 is applied to the side frames and covers the back and front of the machine, extending from a point near the rear cross bar 21 to the upper front of the machine, at the upper edge of the keyboard. The keyboard frame 25 is mounted between the front portions of the side frames 20, being pivoted on the transverse shaft 23 carried by said side frames. The keyboard frame 25 has the rearwardly directed flanges 26, at the sides thereof.

Keyboard frame 25, pivoted on the transverse shaft 23, is releasably held in the position shown in Figs. 2 and 3, but may be quickly and easily released so that it may be swung about the shaft 23 to the horizontal position, indicated by dotted lines in Fig. 9, in which position ready access may be had to the interior of the machine for purposes of repair or maintenance. Referring to Fig. 4, a hole 27 is formed in each side flange 26 of the keyboard frame, near the upper end thereof. A bushing 28 is mounted in a hole in each side frame 20 and this bushing is protruded into a notch 33, that is milled out in the adjacent flange 26 of the keyboard frame. A plunger 29, having a pointed end, is slidably mounted in the bushing 28 and a spring 30 is interposed between a shoulder on the plunger 29 and a shoulder 31 formed in the bushing 28, so that the spring tends to project the plunger 29 into the hole 27 of the keyboard frame flange, to lock the keyboard frame in operative position. A knurled head 32 is fast on the outer end of the plunger 29 and the plunger may be withdrawn from locking position, against the pressure of spring 30, by means of said knurled head. When the keyboard frame is swung to the operative position, with the plungers 29 held withdrawn, the protruding ends of the bushings 28 engage the walls of the milled out notches 33 and limit the inward movement of the upper end of the keyboard frame, at the same time locating the holes 27 opposite the ends of the plungers 29, which can then be released and allowed to snap under spring pressure into the holes 27 to lock the keyboard frame 25 in place.

Mounted on the keyboard frame 25 are sixty operating keys 34, arranged in six rows of ten keys each. One of these keys 34 is assigned to each of the classifications of articles likely to be met with in a bundle of laundry. For instance, one of the keys 34 is assigned to shirts, another to socks, one to tablecloths, another to pajama tops, another to pajama pants, one to bedspreads, another to pillow cases, another to sheets, and so on. It will be noted that these sixty keys 34, arranged in six rows, are in staggered relation to each other, so as to give room for the operating connections. Each key 34 will bear on the key top a legend indicating the class of article to which it is assigned. The construction of the machine is such that these key tops may be made relatively large, so as to afford room for a legend printed in characters sufficiently large to be readily legible by the operator. Fixed, parallel, horizontal shafts 35 are provided, one for each row of keys 34, the ends of said shafts being anchored in the side flanges 26 of the keyboard frame. Keys 34 of the upper row have stems 38 pivoted on the upper shaft 35, and the keys 34 of the remaining rows have stems 37 pivoted on the shafts 35 provided for those rows of keys. Each of the keystems 38 of the upper row of keys has integral therewith a cam extension 39, extending rearwardly from the shaft 35. Interspersed between the cam extensions 39, on the upper shaft 35, are fifty cam members 40, one for each of the keys 34 in the remaining rows of keys. Each cam member 40 has a forwardly extending neck 41, to which the upper end of a link 43 is pivotally connected by a pin 42. The lower end of each link 43 is forked, as at 44, and straddles the stem 37 of the key to which it is assigned, being pivotally connected thereto by a pin 45. The key stems 38 and 37 extend forwardly from the pivot shafts 35 through slots 36 provided in the keyboard frame 25. It will be noted that each of the key stems 38 and 37 may be rocked either clockwise or counterclockwise about its pivot shaft 35. The corresponding cam member 40, or cam extension 39, will be rocked clockwise or counterclockwise about the upper pivot shaft 35, depending upon the direction in which the corresponding key stem is swung.

A shaft 50 is carried by the rearwardly directed flanges 26 of the keyboard frame, extending from one of these flanges to the other, and forms the support for the mechanism for advancing and returning the type wheels, as the several keys 34 are rocked in one direction or the other. Sixty of these mechanisms are provided, one for each of the keys 34. Each of these mechanisms includes a pair of bell cranks 51 and 52, pivotally mounted on the shaft 50, said bell cranks having the forwardly extending arms 53 and 54, between which the corresponding cam member 40, or cam extension 39, is interposed, as shown in Figs. 2 and 3. A spring 55 has its ends connected to the arms 53 and 54 and tends to rock the upper bell crank 51 clockwise, and the lower bell crank 52 counterclockwise, about shaft 50, so as to hold the arms 53 and 54 in engagement with the cam member 40, or cam extension 39. Bell crank 51 has a pawl-carrying arm, on which a feed pawl 57 is pivoted at 56. Bell crank 52 has a pawl-carrying arm extending downwardly, to which a return pawl 59 is pivotally connected at 58. The ends of spring 60 are connected, one to the pawl 57 and the other to the pawl 59, and this spring tends to rock the pawls toward each other until they engage the stop shoulders 51' and 52' provided on the bell cranks 51 and 52, respectively.

A horizontal resetting shaft 46 is rotatably mounted in the side frames 20 of the machine. Journaled on the resetting shaft 46 there are sixty feed gears 47, one for each of the keys 34. Each feed gear 47 has a laterally projecting stud 48 and another laterally projecting stud 49 (see Figs. 3 and 5). Each feed gear 47 is in line with the corresponding feed pawl 57 and return pawl 59, arranged to be actuated by the key 34 that corresponds to the feed gear, and when the key 34 is rocked clockwise the corresponding cam extension 39, or cam member 40, will likewise be rocked clockwise, the corresponding bell crank 51 will be rocked counterclockwise, and the pawl 57 carried thereby will be caused to engage a tooth of the corresponding feed gear 47 and advance that feed gear one step. However, if a key 34 be rocked counterclockwise about its pivot on shaft 35, the correspondingg cam extension 39, or cam member 40, will likewise be rocked counterclockwise, and this will rock the corresponding bell crank 52 clockwise, causing the pawl 59 carried thereby to engage the corresponding feed gear 47 and move that gear one step in the reverse direction, that is, return said gear one step. Thus, if a key has been actuated erroneously, advancing its feed gear 47 one step when it should not be advanced, the error can be corrected by rocking the key 34 counterclockwise to return said feed gear 47 one step.

There is a detent spring 61 for each of the gears 47, engaging the periphery thereof. These detent springs 61 are mounted on a transverse shaft 62, the ends of which are mounted in adjusting brackets 63, pivoted at 64 on the side frame members 20. Each bracket has an elongated slot 65 receiving an eccentric portion 66 on an adjusting screw 67 (see Fig. 11). By turning the screw 67 the adjusting bracket 63 is rocked on its pivot 64 to raise or lower the corresponding end of shaft 62. In this way, the detent springs 61 may be adjusted so as to make proper contact with the space between teeth of the gears 47. These detent springs 61 serve as aligning means for the feed gears 47.

Mounted on the shaft 68, which extends transversely of the machine between the side frame members 20, there are sixty type wheels 69, one for each of the keys 34 of the keyboard. Each type wheel meshes with the corresponding feed gear 47. There are forty teeth in the gear 47 and forty teeth in the type wheel 69. These type wheel teeth, beginning with the tooth 70 and running counterclockwise, have type for printing the numerals "1", "2", etc., up to and including "37". The teeth numbered 71 do not have any type thereon and are blank, and, when a type wheel is positioned so that tooth 71 is at the printing line, no numeral printing will result and the type wheel is in its normal, nonprinting position. The teeth numbered 71' are also blank, having no type thereon. When one of the keys 34 is operated by rocking it clockwise about its pivot, the corresponding feed pawl 57 will engage and advance the corresponding feed gear 47 one step, which also advances the corresponding type wheel 69 one step. Thus, if the key 34 representing "shirts" is depressed, the corresponding type wheel 69 will be moved from the blank or non-printing position to present the numeral type "1" at the printing line. If that key is depressed a second time, the type wheel will be advanced a second step to present the numeral "2", and so on. If the key is depressed in error, a correction may be effected by rocking the key counterclockwise, which moves the feed gear 47 and the corresponding type wheel 69 one step in the reverse direction, to correct for the error.

Journaled on a transverse shaft 72, which extends between the two side members 20 of the frame, are sixty printing arms 73, one for each of the keys 34. Each printing arm has a rearwardly-extending ear 74, a cam notch 75 near the lower end thereof, and a foot 76. A printing plate 77 (see Figs. 12 and 13), of channel-shaped formation, and having type on the lower surface thereof for printing the name of the class of article to which the corresponding key is assigned, is detachably mounted on the foot 76 of each printing arm. The printing plate has notches 78 in the side walls thereof, which receive a pin 79 on the foot of the printing arm, and there are cam notches 80 at the rear of the printing plate, which are engaged by a spring 81 fastened in a slot 82 in the lower end of the printing arm. This provides means whereby the printing plate can readily be removed from the printing arm.

One end of a spring 89 is connected to the upper end of each printing arm 73, above the pivot shaft 72 thereof, and the other ends of the springs 89 are connected to a spring bar 90 carried by and extending between the side members 20 of the frame. These springs 89 tend to swing the printing arms 73 to printing position, in which the printing plates 77 are in position to print the names of the classes of articles assigned thereto. The printing position of the printing arm 73 is determined by the engagement of the notch 75 with a transverse rod 83, the ends of which are mounted in arms 84, pivoted on the shaft 68 near the side members of the frame. Each arm 84 has an oblong slot 85 formed therein, which receives the eccentric portion 84b of an adjusting screw 84a (Fig. 7) journaled in a boss 86 on the adjacent side member 20 of the frame. By turning this adjusting screw, the arm 84 may be adjusted angularly about shaft 68, so that the corresponding end of rod 83 may be accurately positioned to bring the printing plates 77 to the proper printing line. A comb 87 extends forwardly and upwardly from the rod 83 and is provided with slots, one for each of the printing arms 73, in which said arms work. This comb keeps the printing arms properly spaced. A housing 88, formed of sheet metal, is carried by the side members 20 of the frame and extends across the lower front portion of the machine opposite the positions occupied by the lower ends of the printing arms. When these printing arms are moved to non-printing position, as will be described later, they move back within this housing 88.

At the upper end of each printing arm 73, a selector member 91 is pivoted to the ear 74 of the printing arm, by the pin 92. This selector member has a rearwardly extending finger 93, normally lying in the path of the pin 49 on the corresponding feed gear 47. Each selector member 91 also has a forwardly extending finger 94 and an oblong slot 95, concentric with the pin 92 and receiving the shaft 72. A spring 96, mounted in the upper end of each printing arm 73 above the pivot shaft 72, engages the upper edge of the corresponding selector member 91 and tends to rock that selector member clockwise about its pivot pin 92. When a feed gear 47 is displaced from its normal non-printing position, the stud 49 is removed from the finger 93 of the corresponding selector member, and permits the spring 96 to rock that selector member clockwise, so as to move the forwardly-extending finger 94 out of the path of a pick-up ledge 97, attached to a rock shaft 98, which is journaled in the side members 20 of the frame. Two springs 100, one at each side of the machine, connected, at their upper ends, to the ends of the pick-up ledge 97 and, at their lower ends, to pins 101 carried by the side frame members 20, yieldingly hold the pick-up ledge in its normal non-selecting position, against the stop pins 99 carried by said side frame members 20. When the rock shaft 98 is rocked clockwise, by means to be described hereinafter, against the tension of springs 100, the pick-up ledge 97 engages the fingers 94 of all selector members 91 that are in selecting position, that is to say, those selector members which are held in the position, shown in full lines in Fig. 3, by the engagement of the studs 49 on their feed gears 47 with the fingers 93 of the selector members. In the case of feed gears 47 that have been displaced from the normal position, the springs 96 have rocked the selector members 91 clockwise to carry the fingers 94 out of the path of the pick-up ledge 97. When the rock shaft 98 is rocked clockwise, the pick-up ledge 97 engages the fingers 94 of the selector members in selecting position, and rocks them counterclockwise. Since the bottom of the slot 95, of a member in selecting position, engages the shaft 72, it acts as a fulcrum and the corresponding printing arm 73 is rocked counterclockwise to remove the printing plate 77 from printing position.

A shaft 102 is fixed in the side members 20 of the frame and extends transversely of the machine. A pair of platen-operating levers is journaled on the shaft 102, each lever having an upwardly and rearwardly extending operating arm 103 and a forwardly and downwardly extending platen-carrying arm 104. Springs 105, anchored at their rear ends to the side members 20 of the frame and secured at their forward ends to the arms 103, tend to rock the levers, of which arms 103 form a part, counterclockwise and thus tend to counterbalance the weight of the platen and associated parts. A base 106 is carried by the forwardly-extending arms 104 of these two levers, the base having downwardly-extending ears 107, at the ends thereof, which ears are pivoted on pins 108 carried by the arms 104. A platen 109, which may be of rubber or like resilient material, is carried by the base 106, to which there is also secured a sheet metal platen extension 110 extending forwardly therefrom. A bar 111 is adjustably mounted on this extension and serves as a guide or abutment, against which the right-hand edge of the blank or form is placed to position it properly on the platen for printing the numbers and names of the articles in the proper place on the laundry list. Each arm 104 of the platen-operating levers has bearings 112, in which adjusting screws 113 are mounted, said adjusting screws bearing against bosses 114 on the bottom of the base 106. By adjustment of the screws 113, this base may be tilted one way or the other about the axis of pins 108, to bring the platen 109 to the proper level to get a good impression. The upper end of each arm 103 is forked and carries a follower roller 115, which engages a cam 117 fast on a shaft 116 journaled in the side members 20 of the frame, and having an operating crank 118 fast thereto, on the left-hand side of the machine. When the shaft 116 is given a revolution counterclockwise by turning the crank 118, the high spots of cams 117 engage rollers 115 and rock the platen-operating levers counterclockwise, bringing the blank supported on platen 109 against the inking ribbon, which is interposed between it and the type wheels 69 and printing plates 77 at printing position, so as to make an imprint on the blank supported on the platen 109. When the high spots of cams 117 pass out from under the rollers 115, the weight of the platen and its associated parts returns them to the normal position, shown in Fig. 3.

The cams 117 also act on the follower rollers 117a of the selecting mechanism for the printing arms, as best shown in Fig. 2. At each side of the machine, there is a toggle mechanism including a rocker member 119, pivoted on a stud 120 carried by the adjacent side member 20 of the frame. This rocker member 119 has a forwardly and upwardly extending arm 121, from which extends a pin 122. A spring 135 is mounted on the pin 122 and abuts against a shoulder 123 at the junction of the pin 122 and the arm 121. The other end of spring 135 engages a block 124 that is slidable on the pin 122, and which has laterally-extending trunnions 125, received in notches 126 in the forked end 127 of an arm 128, journaled on the shaft 72 and provided with a cam 129. Each cam 129 is adapted to engage a follower roller 130, carried by an arm 131 fastened on one end of the rock shaft 98, to which the pick-up ledge 97 is fixed. When the parts occupy the position shown in Fig. 2, and the shaft 116 is given a revolution, cams 117 will engage the follower rollers 117a and rock the rocker members 119 clockwise about the studs 120. This causes the trunnions 125 on the blocks 124, due to their engagement in the notches 126, to rock the arms 128 and cams 129 counterclockwise about the axis of shaft 72. Springs 135 are compressed until dead center is passed, when they will again expand holding the parts in the moved position, until force is applied to rock the rocker members 119 counterclockwise. The counterclockwise rocking of the cams 129, due to their engagement with the follower rollers 130, will rock shaft 98 clockwise against the tension of springs 100, thus causing the pick-up ledge 97 to engage the fingers 94 of selector members 91 in selecting position and rock the corresponding printing arms 73 to carry them and their printing plates 77 away from printing position. It will be apparent, from Fig. 3, that the high spots of cams 117 act on the follower rollers 117a before they act on the follower rollers 115 and thus, before the printing operation takes place, the rotation of the printer shaft 116 will result in automatically moving away from printing position the printing plates that correspond to feed gears 47 and type wheels 69 that have not been displaced from normal non-printing position. These feed gears and type wheels are those that correspond to keys 34 that have not been actuated since the last resetting operation.

Referring to Figs. 2 and 3, a transversely extending locking rod 132 extends between and is carried by the rocker members 119 and, when these rocker members are swung to the selecting position to actuate the rock shaft 98 and move selected printing arms from printing position, locking rod 132 will be swung into the space between teeth of the gears 47 and lock these gears and the type wheels against movement during the printing operation. Each rocker member 119 also has a laterally-extending flange 134, which cooperates with certain parts that will be described in connection with the resetting mechanism.

The operator may print as many lists as he desires from a given set-up, but it will be necessary to reset the mechanism to normal before setting up for the printing of a different list, representing the contents of a different bundle. This may be accomplished by rotating the resetting crank 136 at the right-hand side of the machine. Referring to Fig. 5, this crank is carried by a hub 137 fast to a pinion 138, which is journaled on a stud 139 carried by the right-hand side member 20 of the frame. Pinion 138 meshes with a pinion 140 having an equal number of teeth, which has a hub 142 journaled in a bearing 141 carried by the right-hand side frame member 20. The hub 142 is keyed by spline 143 to a member 144, which is fastened by a screw 145 to a companion member 146 mounted on the end of shaft 46 and fastened thereto by a set screw 147. Thus, rotation of the resetting crank 136 rotates pinion 138 in one direction, and pinion 140 in the opposite direction, which motion of pinion 140 is transmitted through members 144 and 146 to the shaft 46. Referring to Fig. 5, it will be seen that the left-hand end of the resetting shaft 46 is mounted in the left-hand side frame member 20 in substantially the same manner described with reference to the right-hand end of the shaft. A sleeve 165 is journaled in a bearing 141 carried by the left-hand frame member 20. A member 144 is mounted on the sleeve 165 and fastened thereto by a spline 143. A companion member 146 is secured to member 144 by a screw 145 and member 146 is fastened to the left-hand end of shaft 46 by a set screw 147. Referring to Fig. 5 sixty resetting discs 148, one for each of the gears 47, are mounted on the resetting shaft 46. Each resetting disc is keyed to the shaft 46 by a key 150 (Fig. 3). Each of these resetting discs 148 has a projection 149, which normally lies in front of the stud 48 on the corresponding gear 47. The operator, by means of crank 136, rotates shaft 46 to the limit of movement in the clockwise direction (Fig. 3), which causes the projections 149 on the resetting discs to engage the rear sides of pins 48 and bring all the pins to the normal position shown in Fig. 3. The operator then reverses the direction of rotation of crank 136 and returns that crank and the resetting discs to the normal positions shown in Fig. 3, in which the projections 149 lie in front of the pins 48.

Each of the members 144 has a flange 151 thereon, in which a notch 152 is formed. When the resetting shaft 46 and members 144 are in their normal positions (Fig. 3), and the rocker members 119 are operated by the cams 117 to select the printing plates and take an imprint, the flanges 134 move into the notches 152 and against the front walls of those notches, as shown in dotted lines in Fig. 2. Just as soon as the resetting shaft 46 is turned in the clockwise direction, at the beginning of the resetting operation, the front walls of notches 152 engage flanges 134 and rock the members 119 counterclockwise, thus moving the toggles to the normal position shown in Fig. 2. This causes the cams 129 to move away from the follower rollers 130, so that springs 100 can rock the shaft 98 and the pick-up ledge 97 to the position shown in Fig. 2, in which position springs 100 maintain the ledge 97 against the stop pins 99. Each member 144 has integral therewith a radially-extending finger 153, which lies against the stop 154 when the resetting shaft 46 is in normal position. At the end of the first half of the resetting stroke, these fingers lie above the stops 154, which limit the movement of the shaft 46 in that direction, and at the completion of the resetting stroke, when the parts are in the position shown in Fig. 2, the fingers 153 lie beneath the studs 154.

Each flange 151 has a peripheral notch 155, which, as shown in Fig. 2, is located just in front of the notch 152. A pawl 156 is carried by each rocker member 119, being pivoted on the pin 120, and each of these pawls is held against a stop pin 157 by a spring 158 connected, at one end, to the pawl 156 and, at the other end, to the corresponding rocker member 119. It will be seen that, with the parts in the position indicated in Fig. 2, the engagement of the pawls 156 in the notches 155 prevents the rotation of the members 144 and the resetting shaft 46 clockwise, as is required for the initiation of a resetting operation. The parts are shown in Fig. 2 in the position they occupy at the end of a resetting operation and, because of the coaction of the pawls 156 with the notches 155, a second resetting operation cannot be performed without an intervening printing operation. When the printer shaft 116 is rotated by means of the crank 118, the rocker members 119 will be rocked clockwise and will remain in the position to which they are rocked until the next resetting operation. This movement of the rocker members 119 clockwise carries the pawls 156 out of the notches 155, so that the resetting shaft 46 may be rotated clockwise in a resetting operation. At the beginning of this resetting operation the rocker members 119 will be rocked counterclockwise to the position shown in Fig. 2, and this causes the pawls 156 to engage the peripheries of the flanges 151, on which they ride until the close of the resetting operation when springs 158 cause the pawls 156 to snap into the notches 155 and thus lock the resetting shaft 46 against clockwise movement until the pawls 156 are removed in a subsequent printing operation.

The manner in which the resetting shaft 46 is mounted in the side members 20 of the frame is shown in Fig. 5. Shaft 46 is provided, at each end thereof, with an axially-extending bore 159, the inner portion of which is of reduced diameter forming a shoulder 160. A portion of the bore 159 is internally threaded, as indicated at 161. A stud 162 extends through the hub 142 of gear 140, at the right side of the machine, and a similar stud 162 extends through the sleeve 165 at the left side of the machine. Each of these studs has an externally-threaded portion 163, screwing into the internally-threaded portion 161 of the corresponding bore 159, and each stud also has a pilot portion 164, which extends into the portion of the bore 159 of reduced diameter. This forms a very convenient means for assembling and disassembling the resetting shaft 46, with the gears 47 and resetting discs 148 mounted thereon. By removing the studs 162 and the screws 145, the entire unit, including members 146, may be quickly and easily removed from the machine and this unit may be conveniently replaced in the machine and mounted therein by replacing the screws 145 and the studs 162.

A similar arrangement is used for mounting the type wheel shaft 68, as shown in Fig. 7. The side frame member 20 has a boss 166 provided with a bore therein, through which stud 169 extends. Shaft 68 has an axially-extending bore 167 having an inner portion of reduced diameter forming a shoulder 168. Stud 169 is externally threaded at 170 to screw into an internally-threaded portion of bore 167, and stud 169 has a pilot portion 171 of reduced diameter fitting in the portion of the bore 167 of smaller diameter. The outer end of shaft 68 is mounted in the same manner.

Referring to Fig. 2, hubs 172 are journaled on studs 173, carried by the side members 20 of the frame in line with the axis of shaft 102. The legs 174 of a bail 175, which extends across the platen extension 110, are fixed in the hubs 172. This bail may be made of a translucent plastic material having marks thereon to permit the operator to align the form properly on the platen 109 and platen extension 110. Springs 176 are connected, at their upper ends, to the hubs 172 and, at their lower ends, to pins 176' on the side frame members 20, and tend to rock the bail 175 so as to carry it against the form mounted on the platen.

It is desirable to provide a signal to indicate to the operator that a complete stroke of the resetting crank 136 has been given in one direction, before reversing the movement of the crank, and also for the purpose of indicating to the operator if the movement of the operating crank has not been reversed to restore the parts to normal position. For this purpose an electric lamp 177 (Fig. 1) is provided on the right-hand side frame member 20, near the lower front corner of the machine. Referring to Fig. 14, the electric lamp 177 has terminals 178 and 179, one of which is connected by a lead 180 to one side of the power line. The other terminal is connected by a lead 181 to one terminal 182 of a normally-open microswitch 183, the other terminal 184 of which is connected by the lead 185 to the other side of the power line. It is necessary to close the normally-open microswitch 183 to light the lamp 177. Referring to Fig. 6, the microswitch 183 has an operating button 186 and, at the completion of the forward portion of the resetting stroke, the finger 153 will lie above the stud 154 and contact the operating button 186 to close the microswitch. If the operator completes the forward stroke to the limit of movement in one direction, the microswitch will be closed and the lamp lit, but, if he fails to complete the forward stroke, the light will not come on and he will know that he has to complete the stroke. Just as soon as finger 153 is moved away from stud 154, at the beginning of the return stroke of the resetting crank 136, the microswitch 183 will open automatically and the light will go off. The microswitch 183 is pivoted on a stud 187 carried by the right-hand side frame member 20. A plate 188 is fastened to the side of the microswitch and provided with a slot 189, in which the eccentric portion 190 of an adjusting screw plays. This adjusting screw is mounted in the adjacent side frame member 20, with its eccentric portion in this slot. By turning the screw the microswitch can be tilted slightly on the pivot 187, to adjust the contact between the operating button 186 and the end of finger 153.

Fig. 15 of the drawings is a view of a typical laundry list printed on this machine. The machine prints on the blank, placed on the platen 109 and the platen extension 110, with its right-hand edge resting against the bar 111, the names of the various classes of articles in the bundle and to be included in the list, as indicated at F, from the printing plates 77 that are at printing position at the time of the printing operation. The machine also prints on the blank, as indicated at G, opposte each name, the number of articles of that classification contained in the bundle and included in the list, this printing being made from the type wheels 69. The machine is also arranged to print, at both the top and the bottom of the list, the lot number indicated at A, the mouth, day and year of the date, as indicated at B, C and D, and the operator's number, as indicated at E. In order to print the lot number A, the mouth, day and year, B, C, and D, and the operator's number E, at both the top and bottom of the laundry list, as shown in Fig. 15, two type wheel assemblies are provide, one on the lower front corner of each side frame member 20. Referring to Fig. 9, the side frame member 20 has a horizontal surface 191 formed therein, and a vertical surface 192 at right angles thereto, and the side frame member then continues horizontally toward the rear in the surface 193. A finished surface 194 and a boss 195 are provided on the side frame member for the attachment of parts of this type assembly, said boss being provided with a horizontal keyway. The side frame member is also provided with a laterally extending flange 196. A bearing member 197 is secured to the surface 194 and boss 195 by screws 198, and this bearing member has a bearing 199, in which fits the pilot portion 201, of reduced diameter, of a shaft 200, on which the type wheels 204 are assembled. Shaft 200 has a collar 202 of large diameter, adjacent the outer end thereof, and a forward portion 203, of smaller diameter. A series of type wheels 204 are rotatably mounted on the shaft 200, the rearmost of these type wheels engaging a collar 205 pinned to the shaft. Two type wheels are arranged in pairs and spacing collars 206 are interposed between the pairs. The foremost type wheel abuts against the collar 202 on shaft 200. At each type wheel position, the shaft 200 is provided with a radial socket 207 (Fig. 7), in which works a ball 208 pressed outwardly by a spring 209, and each type wheel 204 has a series of internal notches 210, one for each type position, which notches are adapted to be engaged by the ball 208 to yieldingly hold the type wheel in alignment in an adjusted position. Each type wheel has on its periphery ten type, for printing the numerals "1" to "9," inclusive, and "0," an eleventh type, which may be reserved for printing a special mark, and a blank non-printing position, having no type on its periphery at that point. Each type wheel, therefore, has twelve positions and there are twelve of the internal notches 210.

A rod 211, which serves as a ribbon guide, has its rear end mounted in the socket 212 in the bearing member 197, and its forward end is mounted in a hole 213 in the corner of the plate 214, which also fits on the reduced portion 203 of shaft 200. A pin 215, mounted in the portion 192 of the side frame member 20, extends forwardly through a hole 216 in the plate 214, and has a reduced neck portion 217. A knob 218 is mounted on the forward end of shaft 200 and held thereon by nut 219 (Fig. 1). The hub 220 of this knob 218 has flat sides 221, which fit an irregular opening 222 in a hook member 223 having a notch 224 concentric with the axis of shaft 200, and which may be swung to engage the reduced portion 217 of pin 215, as shown in Fig. 10. Plate 214 is held in predetermined position with reference to shaft 200 by means of a pin 225, carried by said plate 214 and extending into a groove 226 in the side of the collar 202 on shaft 200. By swinging the hook 223 counter-clockwise, the shaft 200 and the type wheel assembly carried thereby may be quickly and easily removed from the machine. The operator may adjust each of the type wheels individually to position to print the desired lot number, date and operator number. Having thus positioned the type wheels, the entire assembly can be easily returned to place and locked in position by swinging the hook 223 clockwise to the position shown in Fig. 10.

Referring to Fig. 2, the member 197 has a laterally-extending ear 227 provided with a socket 229, in which the rear end of shaft 228 is seated. This is the shaft on which the ribbon spool is mounted and the shaft is fastened in place in socket 229 by pin 230 (Fig. 16). Journaled on shaft 228 in front of member 197 is the hub 231 of a bell crank lever having a pawl arm 232 and a laterally-extending operating arm 233 (Fig. 7). Journaled on the shaft 228 (Fig. 16) in front of this hub is a ratchet wheel 234 integral with the rear flange 235. The ribbon spool 236 is journaled on shaft 228 and provided with slots 237 which receive pins 238 extending forwardly from flange 235. A flange 239 is mounted on shaft 228 in engagement with the forward end of ribbon spool 236 and this front flange has an integral knob portion 240, with a knurled periphery. This knob portion has a countersunk recess 241. The knurled head 242 of a screw 243, which is screwed into an internally-threaded socket in the end of shaft 228, has a flange engaging in the outer portion of the countersunk recess 241, and a spring 244 is interposed between the bottom of that recess and head 242, being fixed to the latter so as to be removable with the head and the screw. This spring exerts a braking pressure to prevent too free turning of the spool on the shaft. The forward end of the spool is also provided with slots 237, like those at the rear end, and rearwardly-extending pins 238 are provided on flange 239 and engage in said slots. By turning the flange 239 by the knurled knob 240, the tension on the ribbon may be adjusted manually. To remove the ribbon spool, the screw 243 will be removed by means of the head 242 and the flange will then come off the shaft 228, permitting one to easily remove the ribbon spool. One of these ribbon spools will be mounted in this way on each of the members 197 attached to the side members 20 of the machine frame.

The pawl arm 232 has a housing 245, in which a pawl 246 is slidable, said pawl being in position to engage the ratchet wheel 234. The upper portion of the pawl is reduced and extends through the top of the housing 245, a spring (not shown) being interposed between a shoulder on the pawl and the upper end of a recess in the housing and tending to project the pawl toward the ratchet wheel. The reduced upper end of the pawl has a cam 249, which bears on the upper end of housing 245, pivoted thereto by pin 250, said cam having an operating handle 251. By turning the handle 251 counterclockwise (Fig. 2) cam 249 will bear on the upper end of housing 245 and withdraw pawl 246 from engagement with the teeth of the ratchet wheel 234. The end of operating arm 233 is pivotally connected to the upper end of a link 253, the lower end of which is pivotally connected at 254 to an ear 255 on the arm 104 of the platen-operating lever at the corresponding side of the machine.

A similar ribbon spool mounting and ratchet operating mechanism will be provided on each of the two side frame members 20 of the machine. The direction of ribbon feed may be reversed by moving pawl 246, at one side of the machine, to inoperative position and moving the corresponding pawl, at the other side of the machine, to operative position. Referring to Fig. 1, the inking ribbon passes from the ribbon spool at one side of the machine, beneath the ribbon guide rod 211 at that side of the machine, and thence horizontally to the other ribbon guide and ribbon spool, passing immediately beneath the sets of type wheels for printing the lot number, date and operator's number and beneath the sets of type wheels 69 and printing plates 77 for printing the number of articles in a class and the names of the classes. Of course, the inking ribbon passes between these type wheels and the blank supported on the platen 109.

The operation of the improved laundry listing machine embodying my invention should be quite apparent from the preceding description, but will be explained briefly at this point. It is assumed that the parts are in normal position as shown in Fig. 3, having been brought to that position by a preceding resetting operation. The operator places a blank upon the platen 109 and the platen extension 110, with the right-hand edge of the blank in engagement with bar 111. Bail 175 may be lifted, against the tension of springs 176, to permit the locating of the blank on the platen and, then, the bail is released and tends to hold the blank in position. The operator now goes through the bundle of laundry to be listed and, each time he finds in that bundle an article of a certain classification, he actuates clockwise (Fig. 3) the key 34 corresponding to that classification. For each such actuation of a key 34, the corresponding feed gear 47 will be moved counterclockwise one step from normal, and the corresponding type wheel 69 will be moved one step from normal position in a clockwise direction, with the result that, when the operator has gone through the bundle and completed the setting up of the listing machine to print the list, the type wheels 69, corresponding to the keys 34 that have been actuated, will be in position to print the number of articles of each of said classification found in the bundle. Whenever a feed gear 47 is displaced from the normal position, shown in Fig. 3, the movement of the stud 49 away from the finger 93 of the corresponding selector member 91 will permit the spring 96 to rock that selector member to non-selecting position, shown in dotted lines in Fig. 3. Consequently, at the end of the setting-up operation, those selector members 91 that correspond to keys that have not been actuated in said operation, will be in selecting position, and the selector members 91 corresponding to keys that have been actuated in the setting up operation will be in non-selecting position.

At the end of the resetting operation and during the setting-up operation, the printing arms 73 and the printing plates 77 carried thereby remain in the normal printing position, being yieldingly held in that position by the springs 89. To effect a printing on the list supported by the platen 109, the operator gives a complete revolution counterclockwise to printer shaft 116 by means of the crank 118. The first effect of this rotation of shaft 116 is to rock the rocker members 119 clockwise about the studs 120. Through the toggle link connections this rocks the cam members 129 counterclockwise and these cam members, acting on the follower rollers 130, rock the shaft 98 clockwise, so that the pick-up ledge 97 engages the fingers 94 of those selector members in selecting position and, rocking them about the shaft 72 as a fulcrum, rocks the printing arms 73, corresponding to the selector members 91 in selecting position, out of printing position against the tension of springs 89, thus carrying the printing plates 77 on said arms 73 away from printing position, and leaving at printing position only those printing plates 77 that are carried by arms 73, which correspond to selector members 91 that were in non-selecting position. In other words, the first effect of the rotation of shaft 116 is to move away from printing position those printing members 77 that correspond to keys 34 that were not actuated during the preceding setting-up operation, leaving at printing position the printing members 77 that correspond to keys actuated during such operation. As the shaft 116 continues to operate, the platen-operating levers comprising the arms 104 and 103 are rocked counterclockwise so that the platen 109 carries the blank placed thereon against the type of type wheels 69 at the printing line, and against the printing plates 77 at printing position, so as to print on the blank the numbers of articles and names of the classes of articles found in the bundle listed. At the same time, the blank is carried against the type of type wheels 204 to print thereon the lot number, the date and the operator's number.

If the operator actuates a key 34 erroneously, thus advancing a feed gear 47 and a type wheel 69 when they should not be advanced, this may be corrected for by actuating the key 34 counterclockwise, which will return the feed gear 47 and the type wheel 69 one step. If this one-step return or correction movement of feed gear 47 brings it to normal position, the stud 49 thereon will engage the finger 93 of the corresponding selector member 91, and return that selector member to selecting position against the pressure of its spring 96.

The operator may print as many lists as desired from the same set-up, placing the blanks, one after the other, upon the platen 109 and rotating the printer shaft 116 once for each impression. The selected printing plates 77 remain away from printing position, due to the character of the toggle linkages between the rocker members 119 and the cam arms 129, which hold the pick-up ledge 97 in the selecting position from the time it is moved to that position by rotation of the shaft 116 until the next resetting operation. When the operator desires to set up for printing a new laundry list, she must first perform a resetting operation by rotating the shaft 46 (Fig. 3) first clockwise and then counterclockwise, by means of the resetting crank 136. As has been described above, this causes the fingers 149 on the resetting discs 148 to engage the studs 48 of feed gears 47 that have been dislaced from normal position, and return those feed gears to normal position, after which the resetting discs are rotated counterclockwise to the position shown in Fig. 3. The first movement of the resetting shaft 46 clockwise causes the front walls of the notches 152 to engage the flanges 134 of the rocker members 119, and rock said members counterclockwise to the normal position shown in Fig. 2, thus restoring the toggle linkages and the cam arms 129 to the normal positions and permitting springs 100 to return the pick-up ledge to its normal position. Thereupon, all printing arms 73 and printing plates 77 return to their normal printing positions. When the operator has turned shaft 46 to the full extent in the clockwise direction, during the forward part of the resetting stroke, the signal lamp 177 lights up to tell the operator that he has completed the resetting stroke in one direction. If he fails to turn the resetting crank 136 in the other direction, to return the parts to normal position, the lamp 177 will remain lighted, indicating that the machine has not been operated correctly to effect resetting. As has been described already, the notches 155 and the pawls 156 form an interlock that prevents two successive resetting operations without an intervening printing operation.

One advantage of the improved laundry listing machine shown herein is that, because of the use of the intermediate feed gears 47, which also serve the purpose of feed ratchet wheels, I can use much larger type for printing the number of articles and the names of the articles, and thus provide a machine that will print a more legible laundry list. Another advantage of the machine is that the construction is such that a larger keyboard may be provided, having larger keys with indicators thereon that are more easily read. The machine is of simple construction and assembly and the hinged keyboard construction is one which makes for easier maintenance and inspection, since the keyboard may be swung down to a horizontal position to permit access to the interior of the machine. Another advantage of this machine is the pivoted key construction, by means of which actuation of a key, in one direction, feeds the corresponding type wheel and actuation, in the other direction, reverses the direction of movement of the type wheel to correct for an erroneous operation. This correction is effective even though the corresponding selector member has been moved to position to select a printing member for movement away from printing position. Thus, a full correction of the set-up can be very easily made. The printing impression is not dependent upon the amount of pressure applied by the operator and is uniform, due to the fact that a full revolution of the printing cams forces the platen against the type. The machine also provides means for printing the lot number, the date and the operator's number at both the top and the bottom of the list. The type wheel assemblies for printing this data can be very quickly and easily removed and set to print the desired members. A simple and convenient ribbon spool mounting, and means for reversing the direction of ribbon feed, are also provided.

I am aware that the laundry listing machine shown herein may be varied considerably without departing from the spirit of my invention, and, therefore, I claim my invention broadly, as indicated by the appended claims.

Having thus described my invention, what I claim as new and useful and desire to secure by Letters Patent, is:

1. A laundry listing machine comprising the combination of a plurality of rotatable type wheels; a feed wheel for each type wheel and connected to drive it; a transverse shaft; a pair of pawl-carrying arms for each feed wheel pivoted on said shaft; an advance pawl pivotally mounted on one of said pawl-carrying arms and adapted to engage and advance the corresponding feed wheel one step when said arm is rocked in one direction; a return pawl pivotally mounted on the other pawl-carrying arm and adapted to engage and return the corresponding feed wheel one step when said arm is rocked in the opposite direction; a plurality of pivoted keys, one for each feed wheel, each key having associated therewith a rockable cam arm for operating said pair of pawl-carrying arms; and means operatively connecting each key with its associated cam arm so as to cause the latter to rock one or the other of said pawl-carrying arms depending upon the direction in which said key is rocked on its pivot.

2. A laundry listing machine comprising the combination of a plurality of rotatable type wheels; a feed wheel for each type wheel and connected to drive it; a transverse shaft; a pair of bell cranks for each feed wheel pivoted on said shaft, each bell crank having an operating arm and a pawl-carrying arm; an advance pawl pivotally mounted on the pawl-carrying arm of one of the bell cranks and adapted to engage and advance the corresponding feed wheel one step when the bell crank is rocked in one direction; a return pawl pivotally mounted on the pawl-carrying arm of the other bell crank and adapted to engage and return the corresponding feed wheel one step when the bell crank is rocked in the opposite direction; and a plurality of pivoted keys, one for each feed wheel, each key having associated therewith a rockable cam arm interposed between the operating arms of the corresponding pair of bell cranks for operating the same; and means operatively connecting each key with its associated cam arm so that the rocking of the key in one direction will actuate the advance pawl and the rocking of the key in the other direction will actuate the return pawl.

3. A laundry listing machine comprising the combination of a plurality of rotatable type wheels; a feed wheel for each type wheel and connected to drive it; a key for each type wheel and having a pivoted key stem; a transverse shaft; a plurality of cam members, one for each key, journaled on said shaft; a link connecting each key stem with the corresponding cam member; a feed wheel advancing mechanism for each key including a feed pawl operatively connected with the corresponding cam member for actuation thereby to advance the corresponding feed wheel one step each time the corresponding key stem is rocked in one direction; and a feed wheel return mechanism for each key including a second feed pawl operatively connected with the corresponding cam member for actuation thereby to return the corresponding feed wheel one step each time the corresponding key stem is rocked in the opposite direction.

4. A laundry listing machine comprising the combination of a plurality of rotatable type wheels; a feed wheel for each type wheel and connected to drive it; a plurality of cam members, one for each feed wheel, pivoted on a common axis; a transverse shaft; a pair of pawl-carrying arms for each feed wheel pivoted on said shaft; an advance pawl pivoted on one arm of each of said pair of arms and adapted to engage and advance the corresponding feed wheel one step when said arm is rocked in one direction; a return pawl pivoted on the other arm of each of said pair of arms and adapted to engage and return the corresponding feed wheel one step when said arm is rocked in the opposite direction; connections between said cam members and arms whereby the rocking of a cam member in one direction will rock one pawl-carrying arm of the corresponding pair in one direction and the rocking of said cam member in the opposite direction will rock the other pawl-carrying arm of said pair in the opposite direction; a key for each cam member and having a pivoted key stem; and a link connecting each key stem with the corresponding cam member whereby the rocking of the key in one direction will actuate the advance pawl and the rocking of the key in the other direction will actuate the return pawl.

5. A laundry listing machine comprising the combination of a plurality of rotatable type wheels; a feed wheel for each type and connected to drive it; a transverse shaft; a pair of bell cranks for each feed wheel pivoted on said shaft, each bell crank having an operating arm and a pawl-carrying arm; an advance pawl pivotally mounted on the pawl-carrying arm of one of said bell cranks and adapted to engage and advance the corresponding feed wheel one step when said bell crank is rocked in one direction; a return pawl pivotally mounted on the pawl-carrying arm of the other bell crank of each pair and adapted to engage and return the corresponding feed wheel one step when said bell crank is rocked in the opposite direction; a plurality of cam members, one for each feed wheel, journaled on a common axis, and each interposed between the operating arms of the corresponding pair of bell cranks; a key for each feed wheel having a pivoted key stem; and a link connecting each key stem with the corresponding cam member, whereby rocking a key stem in one direction will advance the corresponding feed wheel one step and rocking said key stem in the opposite direction will return said feed wheel one step.

6. A laundry listing machine comprising the combination of a plurality of rotatable type wheels; a feed wheel for each type wheel and connected to drive it; a plurality of keys, one for each feed wheel, arranged in a plurality of rows and each having a pivoted key stem, the key stems of one row having cam extensions and being pivoted on a common axis; a plurality of cam members, one for each of the keys in the other rows, also pivoted on said axis; a link connecting the key stem of each of the keys in the said other rows to the corresponding cam member; a feed wheel advance mechanism for each key including a feed pawl operatively connected with the corresponding cam extension or cam member for actuation thereby to advance the corresponding feed wheel one step when the corresponding key stem is rocked in one direction; and a feed wheel return mechanism for each key including a second feed pawl operatively connected with the corresponding cam extension or cam member for actuation thereby to return the corresponding feed wheel one step when said key stem is rocked in the opposite direction.

7. In a laundry listing machine, the combination of a main frame; a type wheel shaft carried thereby; a plurality of type wheels journaled on said shaft; a keyboard frame pivoted on said main frame to swing about an axis parallel to said shaft from a normal position to an inspection position; a plurality of key stems, one for each type wheel, pivotally mounted on said keyboard frame; and severable connections between each key stem and the corresponding type wheel carried in part by said main frame and in part by said keyboard frame for advancing the wheel one step when said key stem is rocked in one direction with the keyboard frame in its normal position.

8. In a laundry listing machine, the combination of a main frame; a type wheel shaft carried thereby; a plurality of type wheels journaled on said shaft; a keyboard frame pivoted on said main frame to swing about an axis parallel to said shaft from a normal position to an inspection position; a plurality of parallel pivot rods carried by said keyboard frame; a plurality of key stems, one for each type wheel, journaled on said pivot rods; and severable connections between each key stem and the corresponding type wheel carried in part by said main frame and in part by said keyboard frame for advancing the wheel one step when the key stem is rocked with the keyboard frame in its normal position.

9. In a laundry listing machine, the combination of a main frame; a type wheel shaft carried thereby; a plurality of type wheels journaled on said shaft; a keyboard frame pivotally mounted on said main frame to swing about an axis parallel to said shaft from a normal position to an inspection position; a plurality of parallel pivot rods carried by said keyboard frame; a plurality of key stems, one for each type wheel, journaled on said pivot rods; a supporting shaft carried by said keyboard frame; a plurality of type wheel advancing mechanisms, one for each type wheel, journaled on said supporting shaft; means connecting each key stem with its corresponding advancing mechanism; and severable connections between each advancing mechanism and the corresponding type wheel carried in part by said main frame and in part by said keyboard frame for advancing the wheel one step when the key stem is rocked with the keyboard frame in its normal position.

WILLIAM J. KEUPER.

References Cited in the file of this patent

UNITED STATES PATENTS

| Number | Name | Date |
|---|---|---|
| 936,398 | Angell | Oct. 12, 1909 |
| 1,063,180 | Canine | June 3, 1913 |
| 1,131,865 | Putnam | Mar. 16, 1915 |
| 1,352,070 | Lang | Sept. 7, 1920 |
| 1,442,059 | Engstrom | Jan. 16, 1923 |
| 1,799,408 | Bull | Apr. 7, 1931 |